Aug. 7, 1923.
P. CUSIMANO
CUTTING DEVICE
Filed Nov. 2, 1922
1,463,941
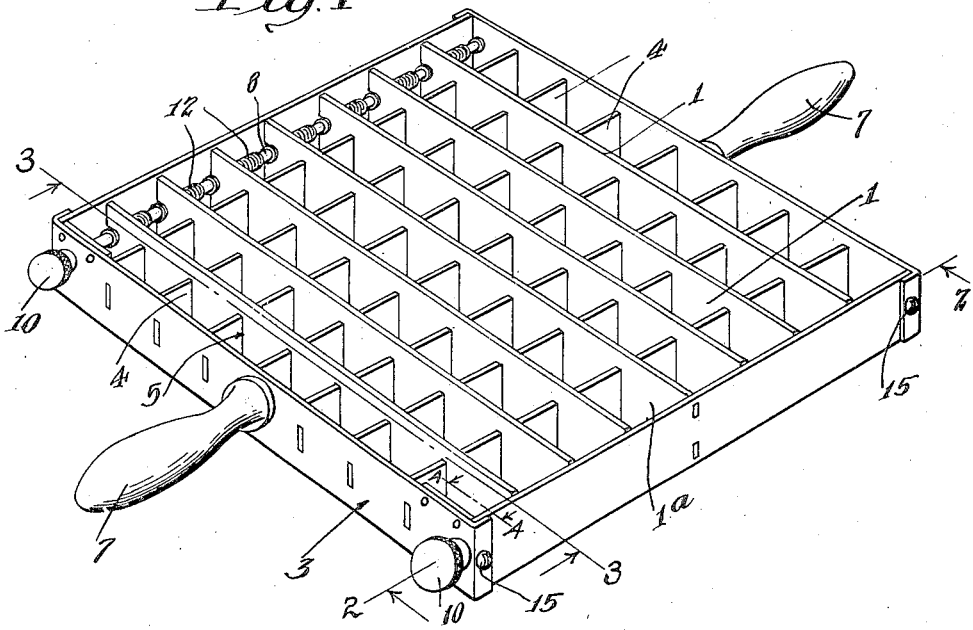
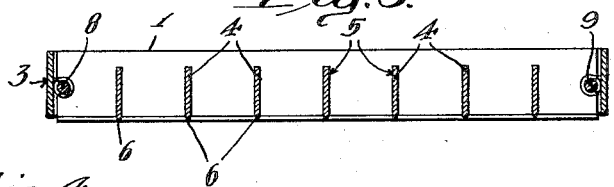
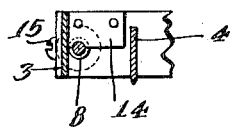
Inventor
Philip Cusimano.
By Lyon & Lyon attys Patented Aug. 7, 1923.

1,463,941

UNITED STATES PATENT OFFICE.

PHILIP CUSIMANO, OF LOS ANGELES, CALIFORNIA.

CUTTING DEVICE.

Application filed November 2, 1922. Serial No. 598,494.

*To all whom it may concern:*

Be it known that I, PHILIP CUSIMANO, a citizen of the United States, residing at Los Angeles, in the county of Los Angeles and State of California, have invented a new and useful Cutting Device, of which the following is a specification.

This invention relates to cutting devices such as used for cutting vegetables or other foods into bodies of uniform size. The general object of the invention is to produce a device of this kind which is of simple construction and which can be readily adjusted at will so as to vary the size of the bodies into which the vegetables or other food is to be cut. The embodiment of the invention disclosed involves the use of a plurality of knives which are mounted substantially parallel to each other, and one of the objects is to provide improved means for effecting the lateral adjustment of the knives simultaneously so as to maintain a substantially uniform distance between the knives in any of their adjusted positions.

Further objects of the invention will appear hereinafter.

The invention consists in the novel parts and combination of parts to be described hereinafter, all of which contribute to produce an efficient cutting device.

A preferred embodiment of the invention is described in the following specification while the broad scope of the invention is pointed out in the appended claims.

In the drawings:

Figure 1 is a perspective of a cutting device embodying my invention.

Fig. 2 is a vertical section through the cutting device taken about on the line 2—2 of Figure 1.

Fig. 3 is a cross section through the device taken about on the line 3—3 of Figure 1.

Fig. 4 is a detail section taken at the corner of the device about on the line 4—4 of Figure 1; this view is also a vertical section.

Referring more particularly to the parts I provide a plurality of knives 1, 1—1ª which are supported in substantially parallel arrangement. These knives are supported in any suitable manner and cooperating with them I provide a member which engages the knives and which when operated will alter the relative positions of the knives. I also provide handles connected with the knives so as to enable the device to be pressed down upon the vegetables or other food to be cut. The knives are preferably mounted in a rectangular frame 3 having a plurality of substantially parallel guide bars 4. The lower edges of the knives 1 have slots 5 which engage over the upper edges of the guide bars 4. The lower edges of the guide bars 4 are also formed into cutting edges 6 (see Fig. 3) so that these members 4 not only operate as guides but also as knives. They are, however, in the present instance not adjustable. On opposite sides the frame is provided with two handles 7 by means of which it can be pressed down upon the article to be cut. As illustrated these handles are attached to the sides of the frame which extend at right angles to the guide knives 4; on the medial line or axis of the frame which lies transverse to the handles, the knife 1ª is located, fixed to the frame at its ends so that this knife is not adjustable. In adjusting the device the other knives 1 may be moved toward or from this fixed knife 1ª.

In order to effect the adjustment of the knives at will I provide an adjusting screw and preferably two adjusting screws, one located at each side of the frame. These adjusting screws are indicated by the reference numerals 8 and 9 (see Fig. 3). Each adjusting screw has a head 10 on the exterior of the frame for rotating it. These adjusting screws pass through the ends of all of the knives; at the middle knife 1ª, a plain neck 11 is provided on each screw which simply rotates freely in the knife 1ª as a bearing; where the screws pass through the adjustable knives they are provided with necks 12 which have threads to engage with threaded open sockets or gaps in the ends of the knives. The threads on the necks that are located on one side of the middle knife 1ª are left hand, while those on the other side are right hand.

The device is constructed so as to provide for an increased amount of adjusting movement in the knives which are remote from the medial axis or knife 1ª so that when an adjustment occurs a substantially uniform distance will always be maintained between the adjustable knives. In order to accomplish this in the present instance it is merely necessary to give the necks 12, which are more remote from the knife 1ª, an increased amount of pitch. With this organization of the parts the rotation of the heads 10 will produce a movement of the knives which will maintain an equal distance between them.

In order to prevent the adjusting screws from shifting longitudinally in the frame, I provide each screw with a collar 13 near the head 10, and between this collar and the side of the frame, I provide a keeper plate 14 which is riveted to the frame and engages in the groove formed between the collar 13 and the inner face of the hub of the head 10. (See Fig. 2.)

The four side bars which produce the rectangular frame 3 may be connected together by screws 15 at the corners of the frame. (See Fig. 1.)

This device may be used for cutting vegetables to uniform size and also for cutting or pressing dough into small cakes or biscuits.

In assembling the parts of this device, the movable blades 1ª are put in their proper positions and the adjusting screws are then brought into their position by a lateral movement so that each threaded neck 12 moves into its corresponding gap or socket in the end of its adjacent blade or knife 1ª.

It is understood that the embodiment of the invention described herein is only one of the many embodiments this invention may take and I do not wish to be limited in the practice of my invention nor in my claims to the particular embodiment set forth.

What I claim is:

1. In a device of the kind described, the combination of a frame, a plurality of knives movably mounted thereon, and having threaded gaps at their ends, a member having threads engaging said knives at said gaps and operating to alter the relative positions of said knives, and handles carried by opposite sides of said frame.

2. In a device of the kind described, the combination of a frame, a plurality of substantially parallel knives movably mounted on said frame, and disposed on opposite sides of a medial axis passing through the frame, said knives having gaps at their ends and adjusting means engaging all the knives at said gaps and operating to give the knives more remote from the medial axis an increased movement when the knives are adjusted to change the distance between them.

3. In a device of the kind described, the combination of a plurality of substantially parallel knives disposed on opposite sides of a medial axis, and having threaded gaps at the ends thereof and an adjusting screw having threaded necks insertable by a lateral movement into said gaps and operating when rotated to move the knives toward or from said medial axis.

4. In a device of the kind described, the combination of a plurality of susbtantially parallel knives disposed on opposite sides of a medial axis, and an adjusting screw having integral threaded necks engaging said knives and operating when rotated to move the knives toward or from said medial axis, the threads on the necks more remote from the medial axis being of greater pitch than the threads of the necks nearer to the axis, whereby the outermost knives are given an increased movement when the adjusting screw is rotated.

5. In a device of the kind described, the combination of a frame, a plurality of substantially parallel knives movably mounted in the frame and disposed on opposite sides of a medial axis passing through the frame, an adjusting screw having integral threaded necks engaging the knives and operated when rotated to move the same toward or from said medial axis, the threads of the necks more remote from the medial axis being of greater pitch than the threads of the necks nearer to the axis, whereby the outermost knives are given an increased movement when the adjusting screw is rotated.

6. In a device of the kind described, the combination of a frame, a plurality of substantially parallel knives fixed in the frame, a plurality of movable knives extending transversely to the fixed knives and having slots receiving the fixed knives and permitting a lateral movement of the movable knives so that they may approach or recede from each other, said movable knives having open threaded gaps in their ends and an adjusting screw at each side of the frame, each adjusting screw having a plurality of integral threaded necks of different pitch constructed to engage in the threaded gaps by a lateral movement of the adjusting screw, the pitch of the threads of the neck increasing progressively toward the outer portions of the frame whereby the rotation of the adjusting screws will give the outermost movable knives increased movement in adjusting the same.

Signed at Los Angeles, California, this 26th day of October, 1922.

PHILIP CUSIMANO.